(12) United States Patent
Torigai et al.

(10) Patent No.: US 6,708,599 B2
(45) Date of Patent: Mar. 23, 2004

(54) COFFEE MAKER

(75) Inventors: Terumi Torigai, Osaka (JP); Takao Kanba, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 58 days.

(21) Appl. No.: 10/174,172

(22) Filed: Jun. 17, 2002

(65) Prior Publication Data

US 2003/0051604 A1 Mar. 20, 2003

(30) Foreign Application Priority Data

Sep. 20, 2001 (JP) ...................................... 2001-286840
Sep. 20, 2001 (JP) ...................................... 2001-286841

(51) Int. Cl.[7] .......................... A47J 31/057; A47J 31/46
(52) U.S. Cl. ............................... 99/286; 99/299; 99/305
(58) Field of Search ......................... 99/286, 290, 299, 99/300, 304, 305, 306, 307

(56) References Cited

U.S. PATENT DOCUMENTS 5,325,764 A * 7/1994 Nakamura et al. ......... 99/305 X

FOREIGN PATENT DOCUMENTS

| JP | 6-22854 | * 6/1992 |
| JP | 06-284971 | 10/1994 |

* cited by examiner

*Primary Examiner*—Reginald L. Alexander
(74) *Attorney, Agent, or Firm*—RatnerPrestia

(57) ABSTRACT

In a coffee maker, a hot-water tank, including water purifying agents and a siphon mechanism, is provided between a coffee-extracting room and a hot-water outlet. This structure reduces an amount of water remaining in the purifying agents. A water tank, a heater which heats the water supplied from the water tank and produces hot water, and a hot-water outlet for pouring the hot water supplied from the heater into the coffee-extracting room are provided. The hot-water tank detachable from a main body of the coffee maker is situated between the outlet and the coffee-extracting room. This structure allows a siphon phenomenon to supply intermittently the hot water from the hot-water tank to the coffee-extracting room. After a coffee extraction, the hot-water tank can be detached from a main body of the coffee maker and washed with ease.

20 Claims, 14 Drawing Sheets

COFFEE MAKER

FIELD OF THE INVENTION

The present invention relates to a coffee maker that extracts coffee solution by spraying hot water over coffee grounds.

BACKGROUND OF THE INVENTION

In a conventional way to produce coffee of superb aroma and taste, coffee grounds are swelled and steamed by hot water, first of all, so that an essential ingredient of the coffee tends to be extracted. Then a proper amount of hot water is supplied intermittently to the coffee grounds for extracting coffee solution. This conventional coffee maker with a steaming function supplies intermittently hot water, which is stored in a hot-water tank built in the coffee maker, to coffee grounds using a siphon phenomenon.

Further, another step is taken to brew tastier coffee, i.e., the hot water runs through water-purifying agents such as activated charcoal in order to remove impurities such as chlorine before the hot water is supplied to a coffee extracting room.

Such a conventional coffee maker is disclosed in Japanese Patent Application Non-Examined Publication No. H06-284971. According to this invention, hot water—supplied intermittently from a tank utilizing the siphon phenomenon—runs downward through the water-purifying agents such as activated charcoal. Thus, the hot water to be purified does not contact the purifying agents for long enough. Therefore, there is a need for a lot of purifying agents, and thus a purifying room has to be enlarged. However, it is difficult to prepare such a room for purifying the water, and it also increases the cost.

If a lot of purifying agents are used, a certain amount of hot water is retained in the agents, and an amount of the water remaining in the purifying room is thus increased when the supply of hot water is finished.

Also in this conventional coffee maker, the siphon phenomenon starts not before the hot water exceeds a given quantity in the hot-water tank. The hot water remaining in the tank at the end of extracting the coffee solution is evacuated therefrom by applying pressure into the tank with steam produced from a heater. Therefore, the tank is integrated airtightly or semi-airtightly into the coffee maker, and the tank is difficult to wash away scales or wipe away drops of water attached to an inner wall of the tank.

SUMMARY OF THE INVENTION

The present invention addresses the problems discussed above, and aims to provide a coffee maker that has the following features: an amount of water remaining in a water-purifying room is reduced; hot water is supplied intermittently in a stable manner to a coffee-extracting room for extracting tasty coffee solution; and a hot-water tank is cleaned with ease. These features are embodied in a simple construction of the coffee maker.

The coffee maker of the present invention comprises the following elements:

(a) a coffee-extracting room; and
(b) a hot-water tank accommodating water-purifying agents, and including a siphon mechanism, the hot water tank being disposed between the coffee extracting room and an outlet for supplying hot water to the coffee extracting room.

This structure supplies purified hot water from the tank to the extracting room via the siphon mechanism.

This structure allows the hot water to be supplied intermittently to the extracting room, so that tasty coffee solution is extracted due to steaming effect, and the siphon mechanism sucks water remaining in the tank, thereby reducing an amount of water left in the tank.

Another coffee maker of the present invention comprises the following elements:

(a) a water tank;
(b) a heater for heating the water supplied from the water tank and boiling it into hot water;
(c) a hot-water tank for storing the hot water supplied from the heater via a supplying path and including a siphon mechanism; and
(d) a coffee extracting room into which the hot water is supplied via the siphon mechanism.

The hot water tank can be separated from the supplying path and detachable from a main body of the coffee maker.

This structure allows the coffee maker to produce coffee with a rich and full aroma and taste due to steaming effect by intermittent supply of the hot water. This structure also allows users to detach the hot-water tank from the main body of the coffee maker and wipe away drops of water as well as wash away scales from the tank with ease.

DETAILED DESCRIPTION OF EXEMPLARY EMBODIMENTS

Exemplary embodiments of the present invention are demonstrated hereinafter with reference to the accompanying drawings.

First Exemplary Embodiment

Figure 1:
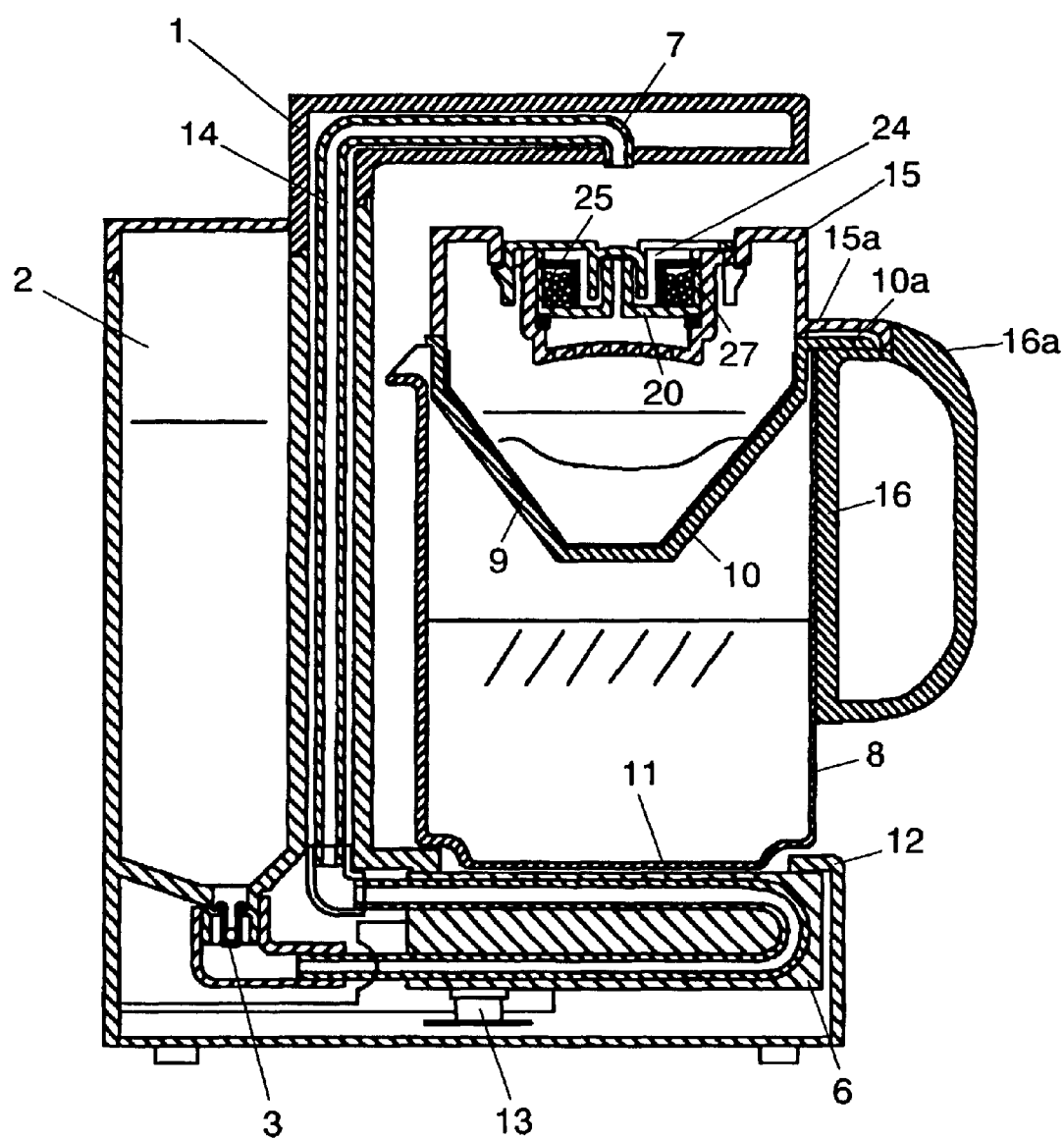
FIG. 1 is a sectional view of a coffee maker in accordance with a first exemplary embodiment of the present invention.

FIG. 1 is a sectional view of a coffee maker in accordance with the first exemplary embodiment of the present invention. In FIG. 1, main body 1 of the coffee maker includes tank 2, which supplies water. Tank 2 is connected to hot-water producer 6 via check valve 3 at a bottom of tank 2. Hot-water producer 6 is connected to water-raising pipe 14 which leads the water to hot-water outlet 7 disposed above producer 6. Producer 6 includes a heater such as an electric heater which is powered by a switch (not shown). This structure allows the water stored in tank 2 to be heated and become hot water when the water passes through hot-water producer 6. The hot water is tapped off from outlet 7 via water-raising pipe 14.

Under outlet 7, decanter 8 for storing coffee solution extracted is situated. At an opening of decanter 8, coffee extracting room 10 is disposed. Inside of extracting room 10, paper filter 9 for extracting the coffee solution is seated. Decanter 8 is seated above hot-water producer 6, namely, on hot plate 11 of warming unit 12. Warming unit 12 controls the power supplied to heater 5 of hot-water producer 6 with thermostat 13 as shown in a circuit diagram of FIG. 8, thereby keeping the coffee solution hot in decanter 8.

Lid 15 covers extracting room 10 and has handle 15a. Decanter 8 has handle 16. Extracting room 10 has handle 10a. Handles 15a is overlaid on handle 10a at upper end 16a of handle 16.

Figure 2:
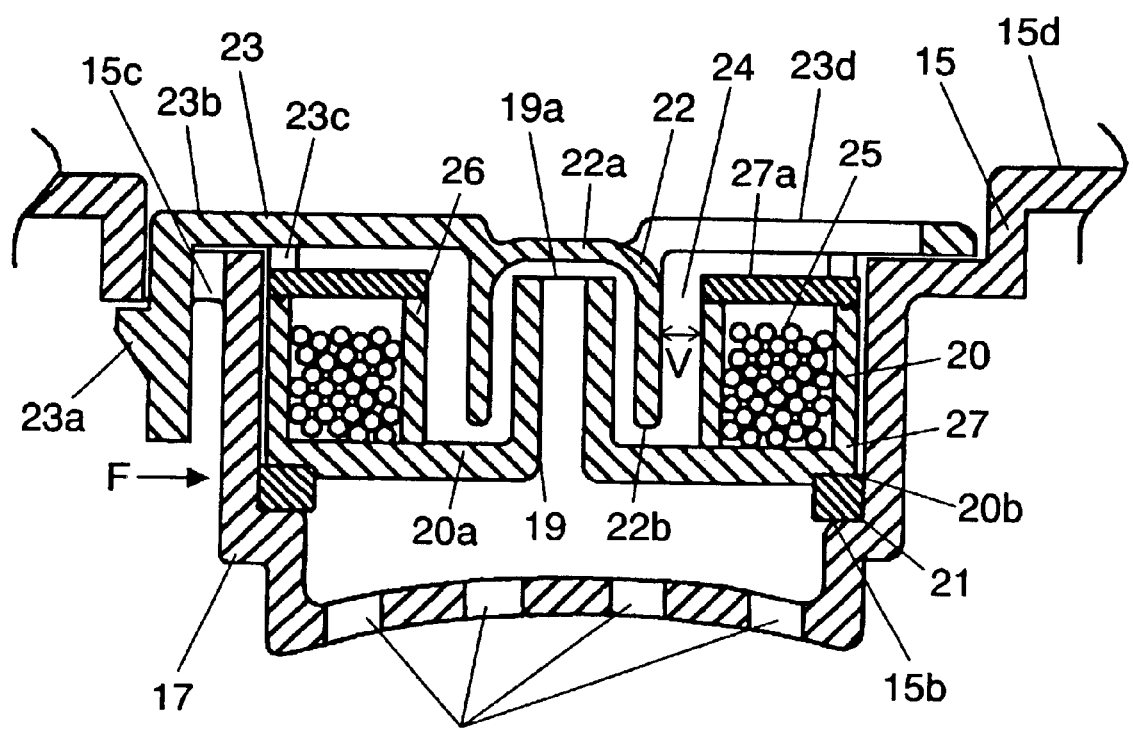
FIG. 2 is detailed sectional view of a lid of a coffee-extracting room of the coffee maker shown in FIG. 1.
Figure 3:
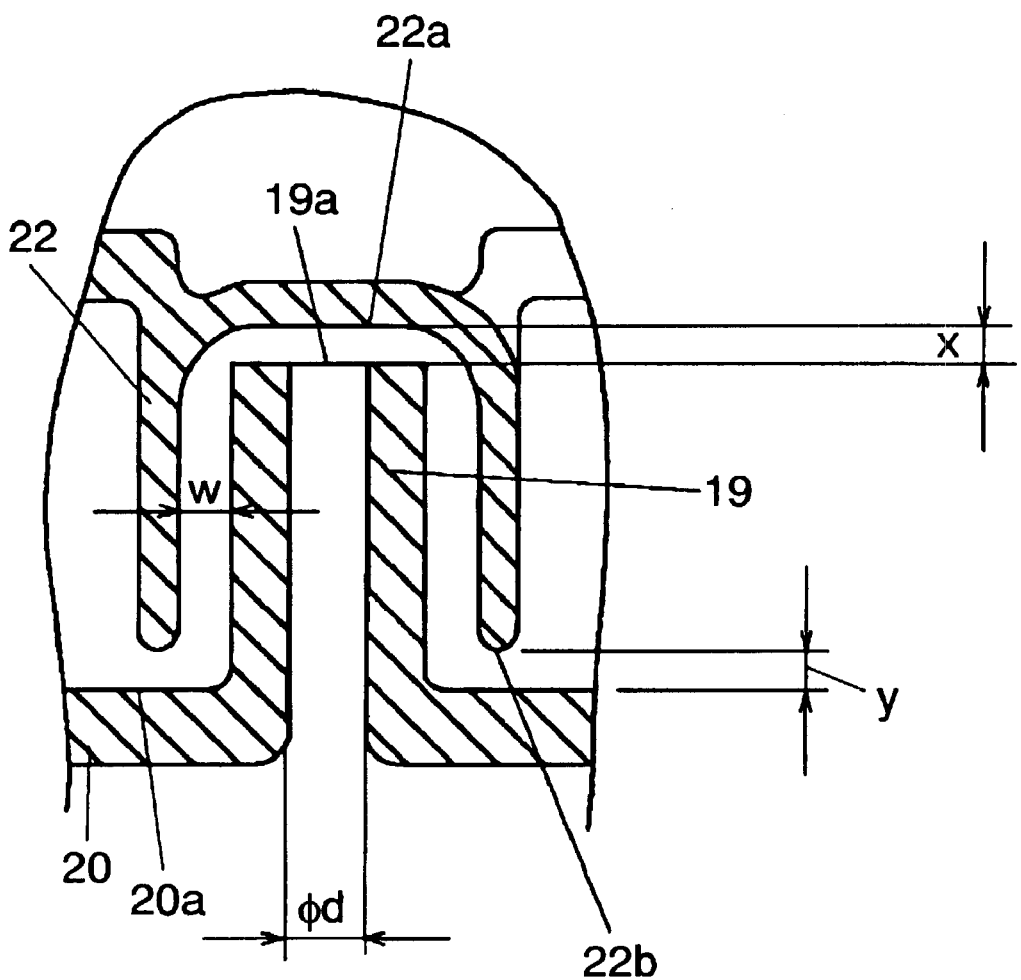
FIG. 3 is a detailed sectional view of a siphon mechanism of the coffee maker shown in FIG. 1.

FIG. 2 is a detailed sectional view of the lid of the coffee-extracting room of the coffee maker shown in FIG. 1. FIG. 3 is a detailed sectional view of a siphon mechanism of the coffee maker shown in FIG. 1. In FIG. 2, cylindrical recess 17 is formed at a center of lid 15 of extracting room 10. At a bottom of recess 17, a plurality of spraying holes 18 are punched. Partitioning board 20, with which pipe 19 is unitarily formed, is disposed in recess 17, and pipe 19 is substantially coaxial with recess 17. In this first embodiment, substantially cylindrical pipe 19 is used. Lower section 20b of partitioning board 20 is seated, via elastic member 21, on step-like mounting section 15b provided to lid 15.

In FIG. 3, cap 22 covers pipe 19 at upper end 19a which is an opening of pipe 19. Space "x" between bottom 22a of cap 22 and upper end 19a of pipe 19 is prepared not greater than a maximum inner diameter "d" (hereinafter called inner diameter "d") at upper end 19a of pipe 19. Space "y" between tip 22b of cap 22 and bottom 20a of partitioning board 20 is prepared at least equal to space "x" discussed above.

Figure 4:
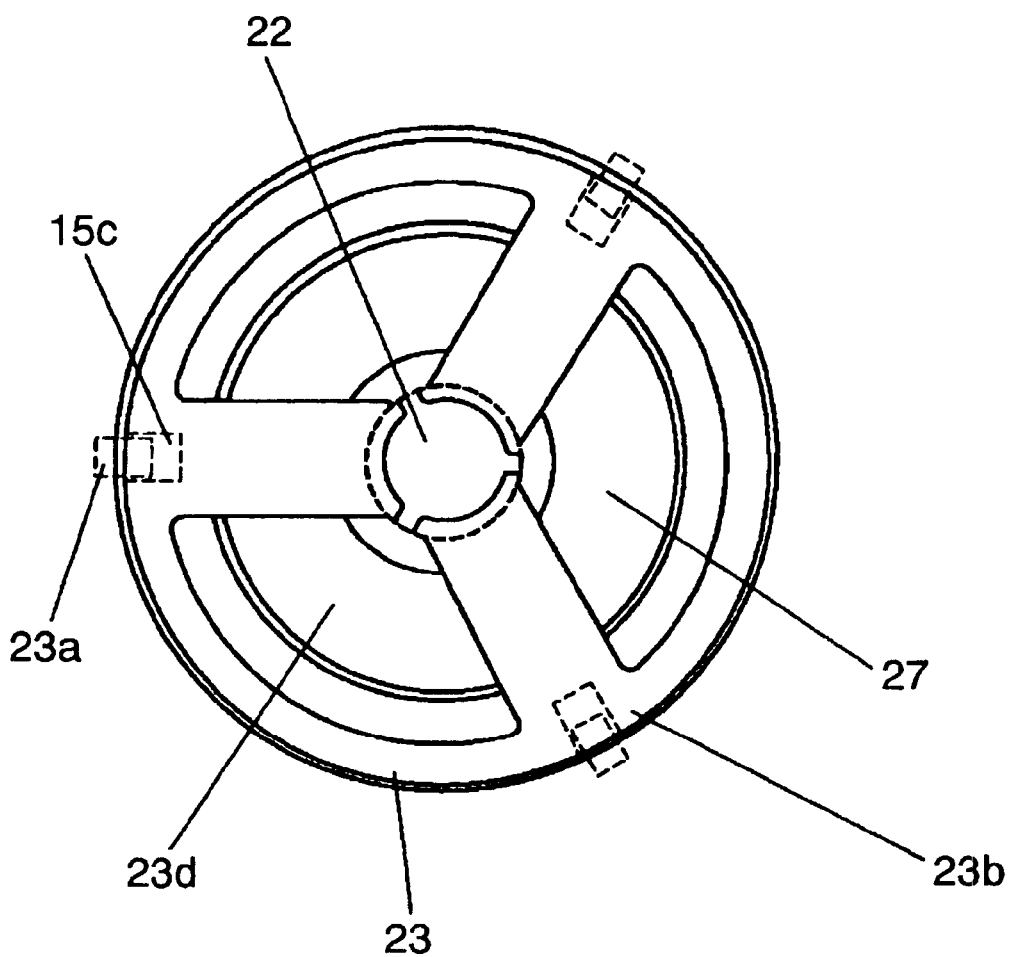
FIG. 4 is a plan view of a fixing frame disposed on the lid of the coffee extracting room of the coffee maker shown in FIG. 1.

Fixing frame 23 shown in FIG. 2 fixes cap 22 to lid 15 and is formed unitarily with cap 22. Claws 23a (three claws) provided at tips of frame 23 are inserted respectively into mounting holes 15c punched at lid 15, so that lid 15 and members (fixing frame 23) forming cap 22 pinch partitioning board 20. Each one of claws 23a is deformed along direction "F" and released from the mounting hole 15c, then fixing frame 23 is removed from lid 15, whereby partitioning board 20 becomes ready to be detached. Further, upper face 23b of frame 23 is set such that face 23b is lower than upper face 15d of lid 15. Lib 23c formed on a lower face of frame 23 is brought into contact with board 20. FIG. 4 is a plan view of the fixing frame disposed on the lid of the coffee extracting room of the coffee maker shown in FIG. 1. Three holes 23d are punched on upper face 23b of fixing frame 23.

This structure discussed above forms a siphon mechanism, including pipe 19 and cap 22, in hot-water tank 24, and allows the siphon phenomenon to work.

Further, as shown in FIG. 2, hot-water tank 24 accommodates water-purifying agents 25. In other words, water-purifying room 27 is formed unitarily with partitioning board 20 around cap 22, and agents 25 such as granular activated charcoal are stored in room 27. A mesh side-wall of purifying room 27 is provided on a side facing the siphon mechanism including pipe 19 and cap 22.

Figure 5:
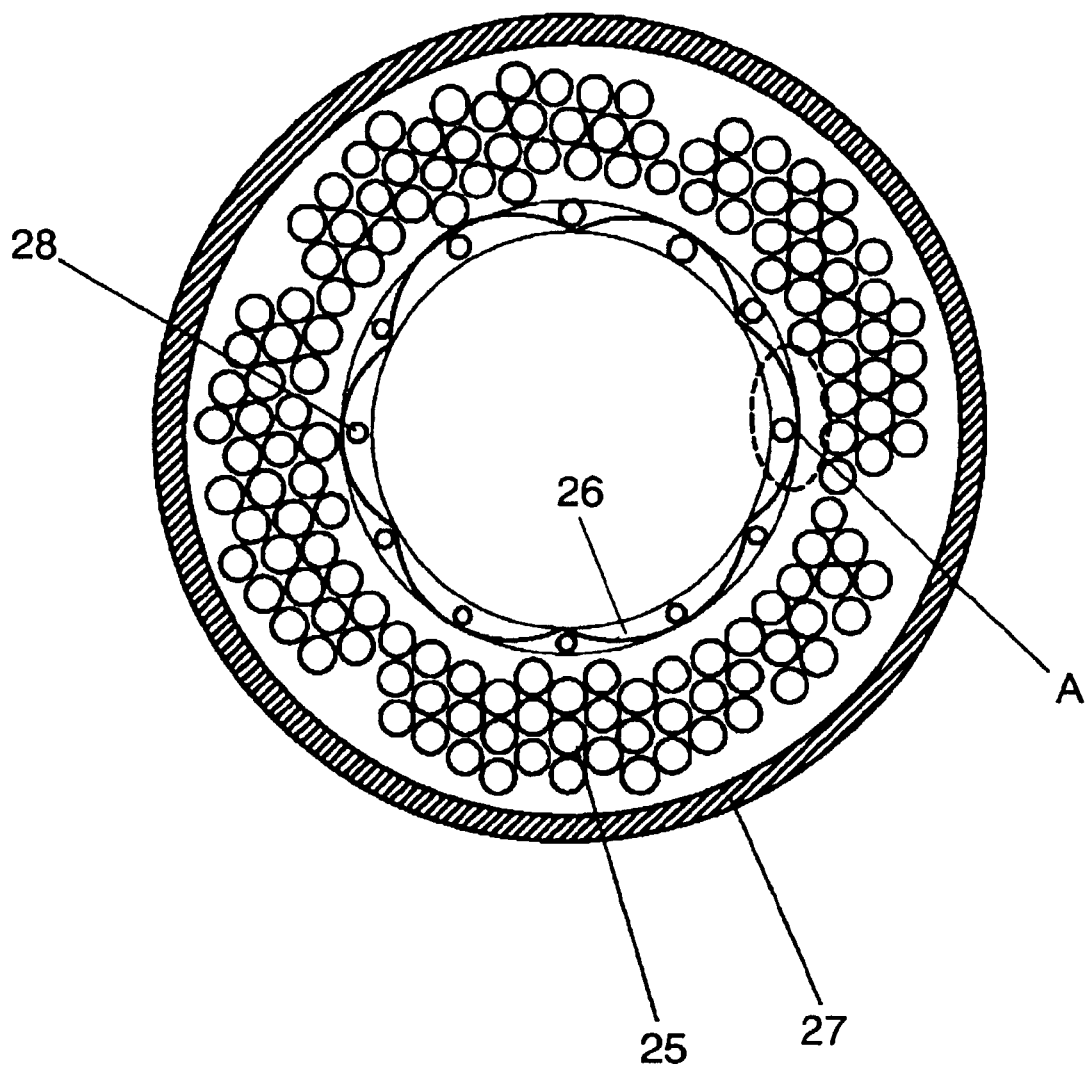
FIG. 5 is a plan sectional view of a water-purifying room of the coffee maker shown in FIG. 1.

FIG. 5 is a plan sectional view of the water-purifying room of the coffee maker shown in FIG. 1. As shown in FIG. 5, net 26 is formed of one belt-shaped sheet. A length of net 26 is prepared such that net 26 is passed around a plurality of poles 28 alternately and duplicated at section A. Lid 27a of purifying room 27 is attached to an upper end of partitioning board 20 by melt-welding, so that purifying room is partitioned. Space "v" between net 26 and an outer wall of cap 22 is prepared at least equal to space "w" between pipe 19 and an inner wall of cap 22. Water-purifying room 27 is situated lower than bottom 22a of cap 22.

Figure 6:
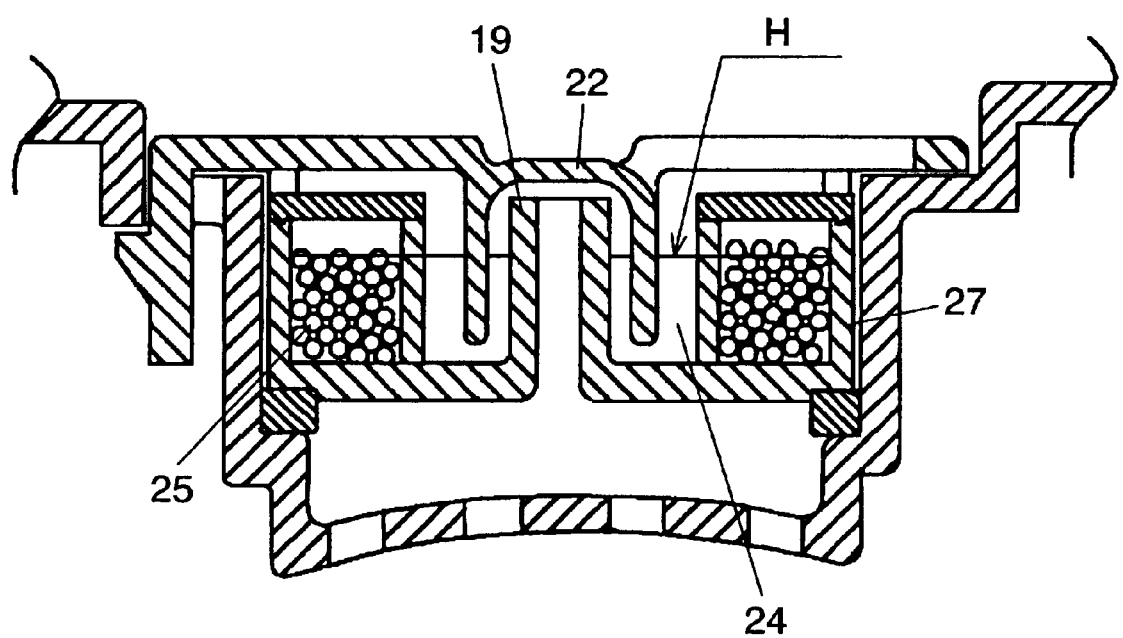
FIG. 6 is a detailed sectional view illustrating a status of the hot water stored in a hot water tank of the coffee maker shown in FIG. 1.

An operation of the coffee maker constructed above is demonstrated hereinafter. A proper amount of water is poured into tank 2, and paper filter 9 is seated in coffee-extracting room 10. Then a proper amount of coffee grounds is put on filter 9. Decanter 8, on which hot-water tank 24, lid 15 and extracting room 10 are mounted, is seated on warming unit 12. The power switch is turned on, then the water in tank 2 is led to hot-water producer 6 via check valve 3 and heated into hot water. Bubbles produced then raise the hot water through water-raising pipe 14 due to the operation of check valve 3. The hot water is thus supplied via outlet 7 to hot-water tank 24 disposed on lid 15. At this time, the hot water supplied from outlet 7 runs through holes 23d punched at fixing frame 23 as shown in FIG. 4, and permeates into a space between pipe 19 and cup 22 as well as water-purifying room 27. Water level "H" of the space and room 27 is thus raised as shown in FIG. 6. Since upper face 23b of frame 23 is situated lower than upper face 15d of lid 15 as shown in FIG. 2, the hot water supplied from outlet 7 does not flow outside lid 15, but flows positively into tank 24.

Figure 7:
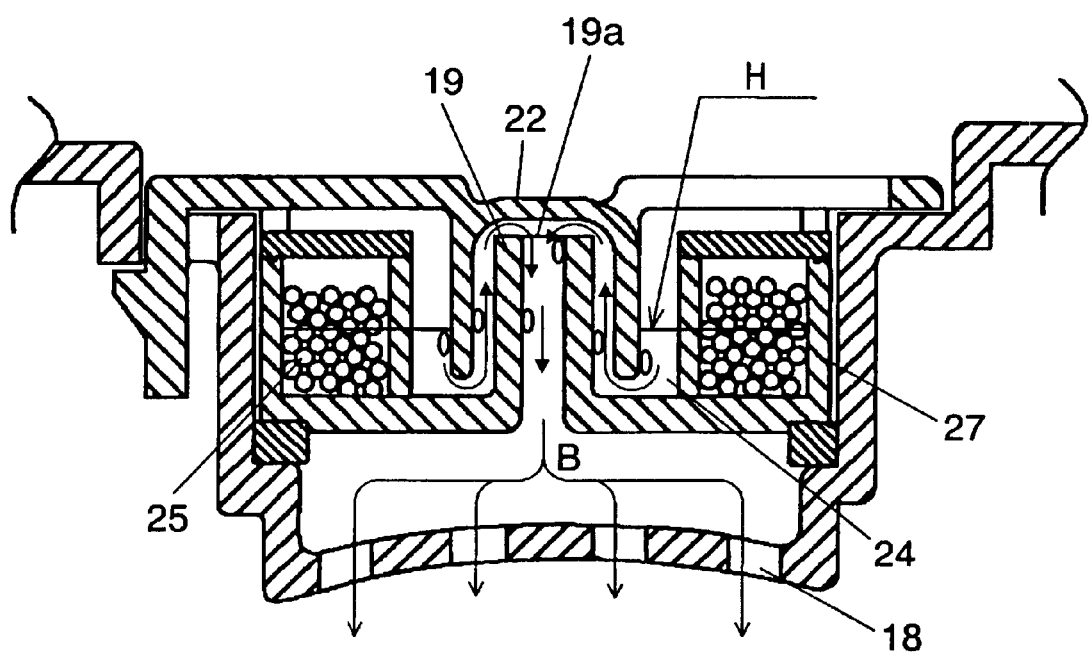
FIG. 7 is a detailed sectional view illustrating an operation of a siphon in the tank of the coffee maker shown in FIG. 1.

In due course, as shown in FIG. 7, water level "H" of the hot water is about to exceed top 19a of pipe 19 due to a siphon phenomenon (this water level shows the maximum water volume of tank 24). Then the hot water in tank 24 is supplied via the inside of pipe 19 to the bottom of recess 17 of lid 15 as shown with arrow mark "B". The hot water is sprayed uniformly over the coffee grounds in extracting room 10 through the plurality of spraying holes punched at the bottom of recess 17. A running speed of the hot water flowing out from tank 24 due to the siphon phenomenon is faster than a supplying speed of the hot water from outlet 7. Therefore, air entering inside cap 22 together with the hot water through space "y" shown in FIG. 3 communicates to air entering into pipe 19 from the outside at space "x" above pipe 19. Then the flow of the hot-water due to the siphon phenomenon is broken. This operation is repeated onward, thus the hot water is intermittently supplied from tank 24 to extracting room 10.

As discussed above, the siphon phenomenon, occurring when the water level of the hot water in tank 24 is about to exceed top 19a of pipe 19, is used for intermittent supply of the hot water into extracting room 10. During the intermittence of supplying the hot water, the coffee grounds in extracting room 10 can be well steamed and ready to be extracted the essence. Further, the next supply of the hot water and onward always supply an amount of the maximum volume of tank 24, and the coffee grounds are agitated in extracting room 10 while the coffee solution is extracted and stored in decanter 8. When the hot-water flow is broken intermittently due to the siphon phenomenon, the hot water in tank 24 is ready to be sucked up.

In this first embodiment, net 26 of purifying room 27 is situated to face the siphon mechanism formed of pipe 19 and cap 22. This arrangement can reduce resistance in a flow path where water is sucked, so that an amount of water remaining in purifying agents 25 (granular activated charcoal) is reduced. Net 26 has mesh fine enough not to pass the water-purifying agents. Agents 25 thus cannot pass through net 26 or flow out between pipe 19 and cap 22. This structure prevents an inconvenience, e.g., the siphon phenomenon does not work well because space "y" is clogged. Further, since water-purifying room 27 is situated lower than bottom 22a of cap 22, water purifying agents 25 are always brought into contact with the hot water when tank 24 stores the hot water. This structure accelerates the purification of the hot water.

Figure 8:
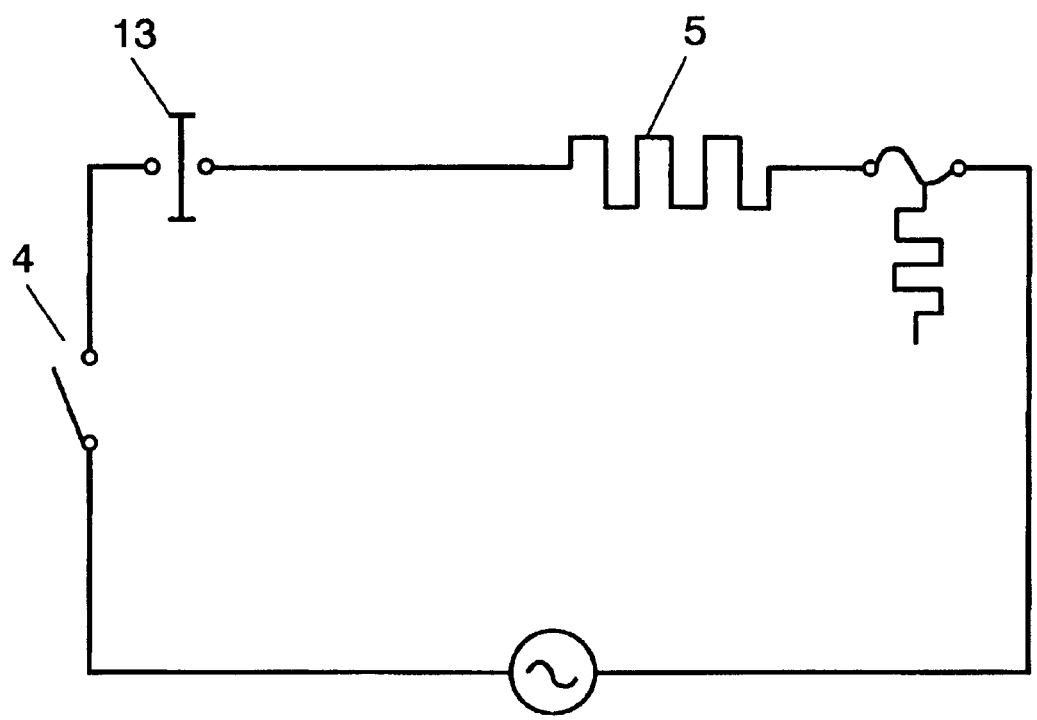
FIG. 8 is a circuit diagram of the coffee maker shown in FIG. 1.

When thermostat 13 shown in FIG. 8 works, supply of power to heater 5 is once stopped; however, the coffee solution in decanter 8 seated on warming unit 12 can be kept hot due to an automatic operation of thermostat 13. This warming operation is kept going until power switch 4 is turned off.

After a use of the coffee maker, decanter 8, extracting room 10, lid 15 and others are to be washed. Since partitioning board 20 is pinched by fixing frame 23 and lid 15, these components are not easily dismounted even the coffee maker is turned upside down in washing. When claws 23a of frame 23 are deformed in direction "F" and released upward from mounting holes 15c, water-purifying room 27 can be replaced with ease.

According to the first embodiment, the intermittent supply of the hot water allows the coffee maker to extract tasty coffee solution of good body due to steaming effect. The siphon phenomenon in the hot-water tank sucks water, thereby reducing an amount of water remaining in the water-purifying agents.

Second Exemplary Embodiment

Figure 9:
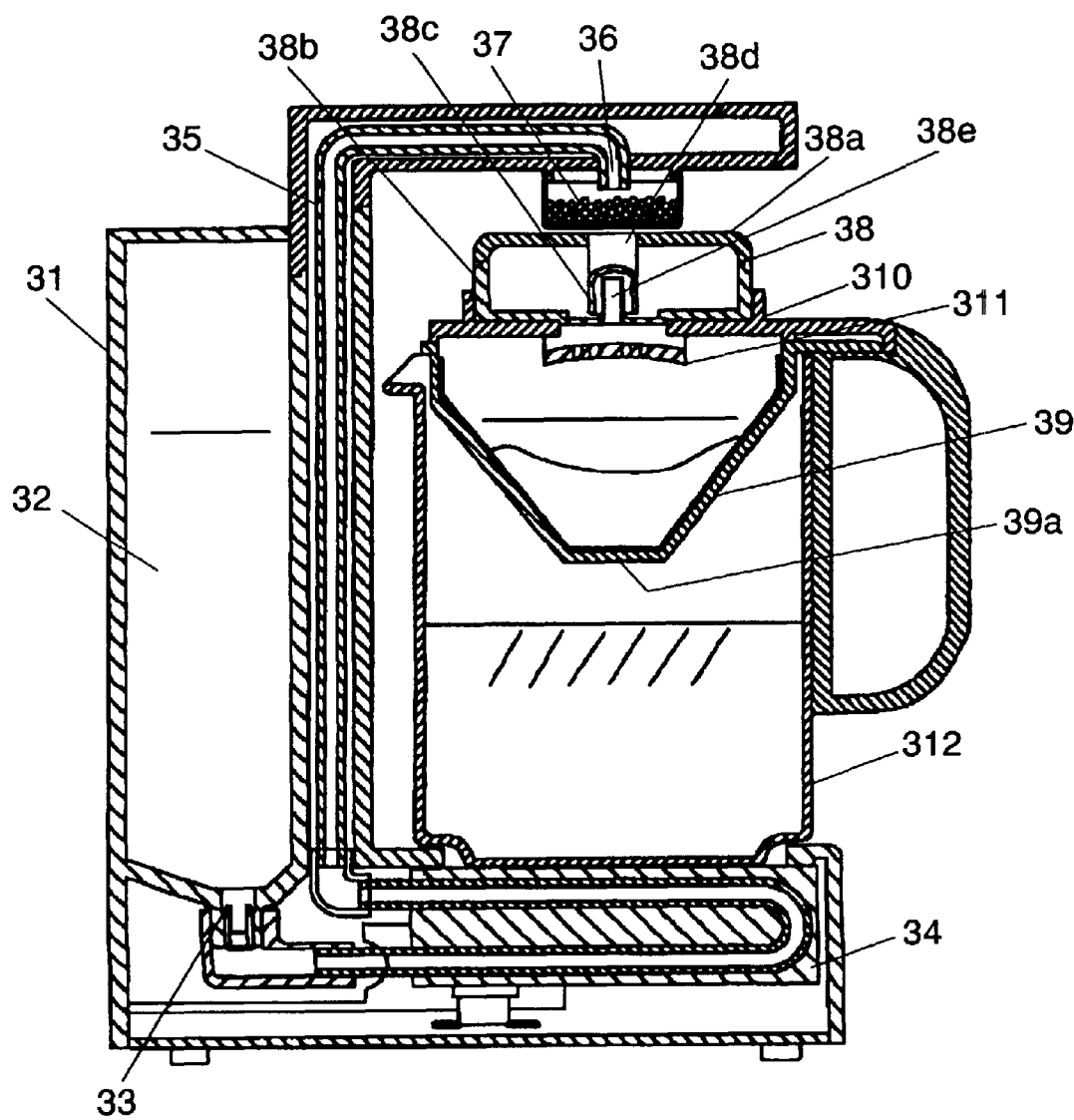
FIG. 9 is a vertical sectional view of a coffee maker in accordance with a second exemplary embodiment of the present invention.

FIG. 9 is a vertical sectional view of a coffee maker in accordance with the second exemplary embodiment of the present invention. In FIG. 9, main body 31 of the coffee maker includes water tank 32. Check valve 33 is mounted on a bottom of tank 32. Through check valve 33, tank 32 communicates to heater 34 formed of an electric heater disposed at a lower section of main body 31, water-raising pipe 35 leading heated-water to an upper part of main body 31, and hot-water outlet 36 provided to an upper section of main body 31. In other words, a hot-water supplying path is formed between heater 34 and outlet 36 via pipe 35. Water purifier 37 including activated charcoal is mounted to main body 31 at beneath outlet 36. Detachable hot-water tank 38 is disposed under water purifier 37. Tank 38 is separated from the hot-water supplying path. In this second embodiment, hot-water tank 38 is detachable from an upper face of lid 310 of coffee-extracting room 39. Coffee grounds are put on a filter seated in extracting room 39, and coffee solution is extracted through extracting hole 39a punched at a bottom of room 39.

Hot-water tank 38 is formed of upper container 38a and lower container 38b. The containers can be separated each other. Upper container 38a includes cap 38c open downward, inlet 38d which introduces hot water passed through purifier 37. Lower container 38b includes pipe 38e extruding into cap 38c. Pipe 38e and cap 38c form a siphon mechanism. When the hot water is stored up to an upper section of cap 38c, this structure allows the hot water to be discharged intermittently from pipe 38e due to a siphon phenomenon.

Sprinkler 311 is unitarily formed with lid 310 on its rear face and is situated under pipe 38e through which the hot water from tank 38 is discharged. At an opening of decanter 312, lid 310 and extracting room 39 are detachably disposed. Decanter 312 stores the coffee solution extracted.

An operation of the coffee maker in accordance with the second embodiment is demonstrated hereinafter. First, water in tank 32 runs into heater 34 via check valve 33, then the water is boiled and becomes hot water. The steam pressure raises the hot water from heater 34 to outlet 36 via raising-pipe 35, and the hot water is supplied to water purifier 37. The hot water purified is poured into tank 38 from main body 31. As such tank 38 stores the hot water increasingly, and when the level of the hot water exceeds cap 38c, a siphon phenomenon occurs and gushes the hot water stored in tank 38 through pipe 38e. This hot water is diffused by sprinkler 311 and poured into extracting room 39, where coffee solution is extracted. Then the coffee solution is stored in decanter 312.

If some hot water (the amount is not enough to activate the siphon phenomenon) remains in tank 38 after the extraction, the remaining hot water can be discarded by removing tank 38 from lid 310. This removal allows a user to separate tank 38 into upper container 38a and lower container 38b, so that the user can wash the inside of these containers with ease. After tank 38 is removed, lid 310 can be utilized advantageously as a lid of decanter 312.

As discussed above, according to the coffee maker in accordance with the second embodiment, hot water is supplied intermittently to extract tasty coffee solution of good body. On the other hand, drops of water can be wiped away and scales can be washed away with ease from the hot-water tank after the extraction.

Third Exemplary Embodiment

Figure 10:
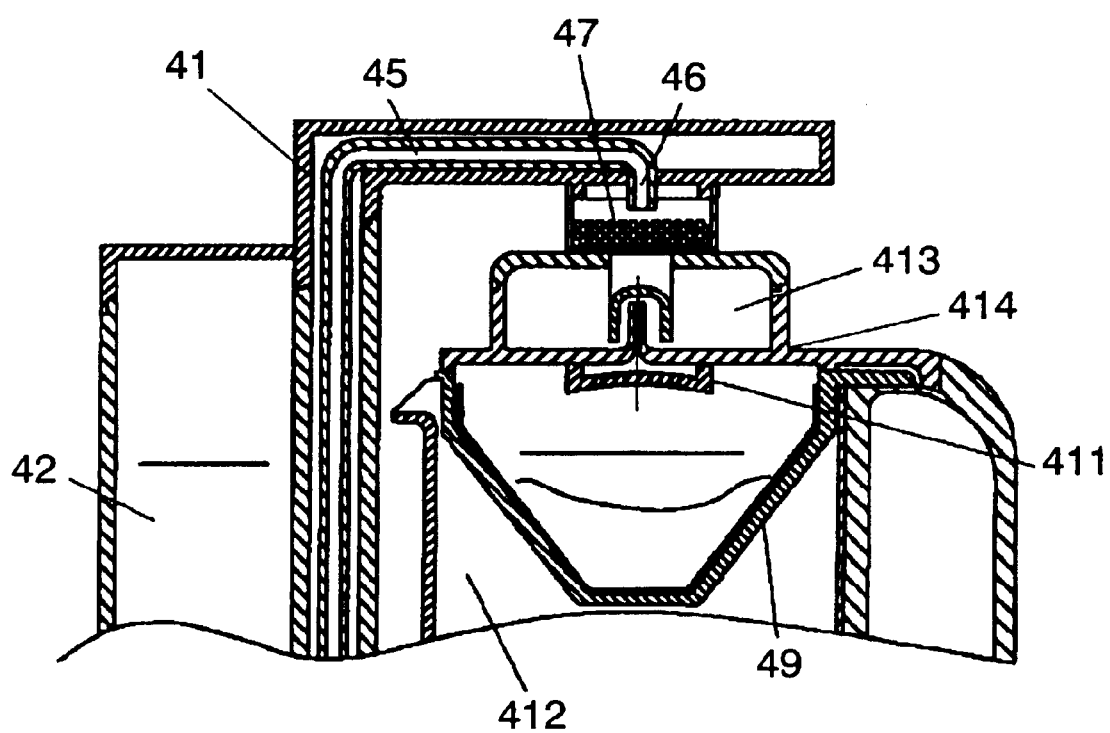
FIG. 10 is a sectional view of an essential part of a coffee maker in accordance with a third exemplary embodiment.

FIG. 10 is a sectional view of an essential part of a coffee maker in accordance with the third exemplary embodiment. The third embodiment differs from the second one in the following point. In this third embodiment, hot-water tank 413 is unitarily formed with an upper section of lid 414 which is detachable from coffee-extracting room 49, and tank 413 is disposed on lid 414. This structure reduces a number of components, and tank 413 can be handled together with lid 414. The basic structure of tank 413 is similar to that of tank 38 described in the second embodiment.

According to the coffee maker in accordance with the third embodiment, hot water is supplied intermittently, thereby extracting tasty coffee solution of good body. Similar operation and advantage to those of the embodiments previously discussed can be thus expected.

Fourth Exemplary Embodiment

Figure 11:
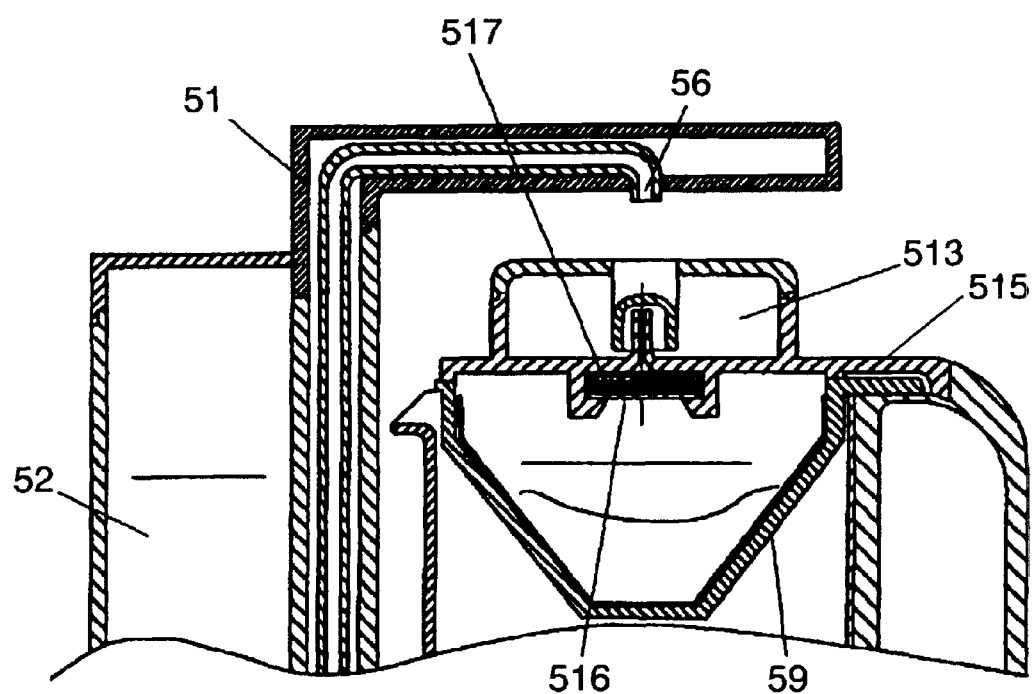
FIG. 11 is a sectional view of an essential part of a coffee maker in accordance with a fourth exemplary embodiment.

FIG. 11 is a sectional view of an essential part of a coffee maker in accordance with the fourth exemplary embodiment. The fourth embodiment differs from the embodiments previously discussed in the following points.

In this fourth embodiment, beneath a siphon mechanism in hot-water tank 513, sprinkler 516 is unitarily formed with water purifier 517 including activated charcoal. Sprinkler 516 together with water purifier 517 is detachable from lid 515. According to this structure, hot water is supplied intermittently, thereby extracting tasty coffee solution of good body. Similar operation and advantage to those of the embodiments previously discussed can be thus expected. Further, a number of components can be reduced. Tank 513, sprinkler 516 and water purifier 517 can be washed at the same time.

Fifth Exemplary Embodiment

Figure 12:
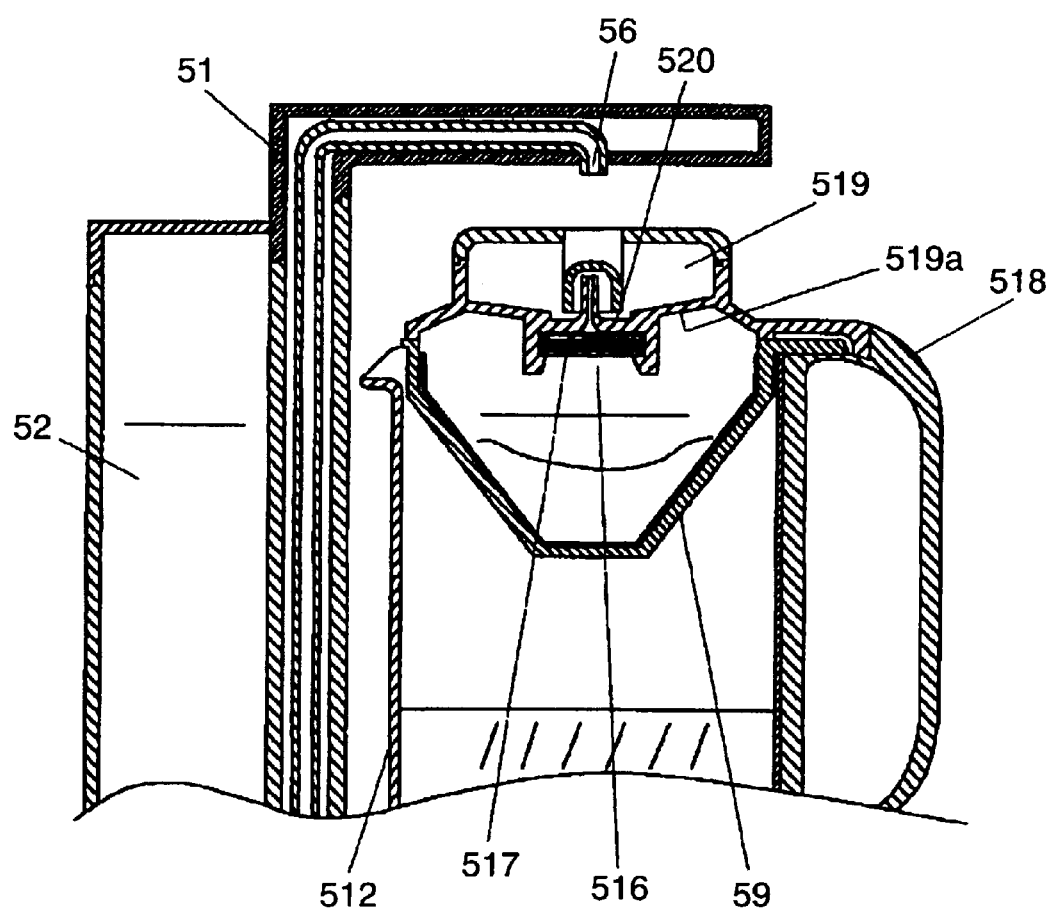
FIG. 12 is a sectional view of an essential part of a coffee maker in accordance with a fifth exemplary embodiment.

FIG. 12 is a sectional view of an essential part of a coffee maker in accordance with the fifth exemplary embodiment. Similar elements to those of the fourth embodiment have the same reference marks, and the descriptions thereof are omitted here.

The fifth embodiment differs from the embodiments discussed previously in the following points. In this fifth embodiment, a bottom face 519a of hot-water tank 519 slants, and draining hole 520 is punched at the bottom. Draining hole 520 has a reasonable size not to impede a siphon phenomenon.

If some hot-water (this amount is not enough to activate the siphon phenomenon) remains in tank 519 after an extraction, slanting bottom face 519a and draining hole 520 work to discharge a little amount of the remaining hot water to water purifier 517 prepared beneath tank 519. This little amount of the remaining hot water does not impede the siphon phenomenon. Therefore, while coffee solution left in coffee-extracting room 59 is poured into decanter 512, the amount of the hot water remaining in tank 519 can be reduced. A basic structure of hot-water tank 519 is similar to that of tank 38 described in the second embodiment. Similar advantages to those of the embodiments previously discussed can be expected.

Sixth Exemplary Embodiment

Figure 13:
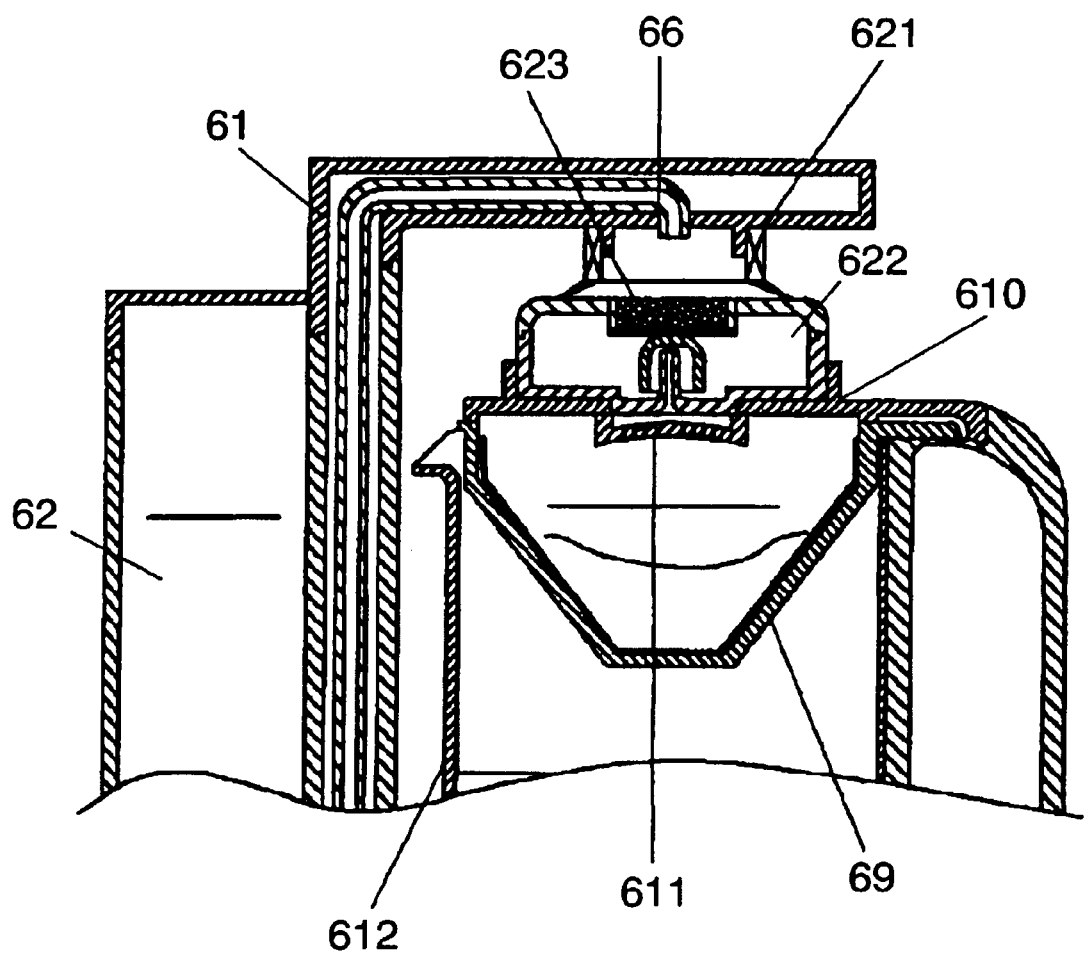
FIG. 13 is a sectional view of an essential part of a coffee maker in accordance with a sixth exemplary embodiment.

FIG. 13 is a sectional view of an essential part of a coffee maker in accordance with the sixth exemplary embodiment. The sixth embodiment differs from the embodiments previously discussed in the following points.

In this sixth embodiment, elastic sealing section 621 is provided to main body 61 of the coffee maker and sealing section 621 surrounds hot-water outlet 66. Hot-water tank 622 is placed such that tank 622 is brought into contact with sealing section 621. Tank 622 is situated under hot-water outlet 66. Water purifier 623 is disposed in tank 622, which has a siphon mechanism as the second embodiment does. Tank 622 is detachable from an upper face of lid 610 of coffee-extracting room 69.

After an extraction, steam produced by a heater (not shown) spouts out from outlet 66, and is sent into hot-water tank 622 with a certain pressure due to sealing effect of sealing section 621. This pressure can discharge an amount of hot-water (this amount is not enough to activate the siphon phenomenon) remaining in tank 622 to the outside. This structure thus reduces the amount of the hot water remaining in tank 622 after the extraction. After the extraction, this structure allows a user to detach tank 622 from main body 61 and wash it with ease. In the sixth embodiment, tank 622 is detachable from the upper face of lid 610 of extracting room 69; however, instead of this structure, tank 622 can be unitarily formed with lid 610.

Seventh Exemplary Embodiment

Figure 14:
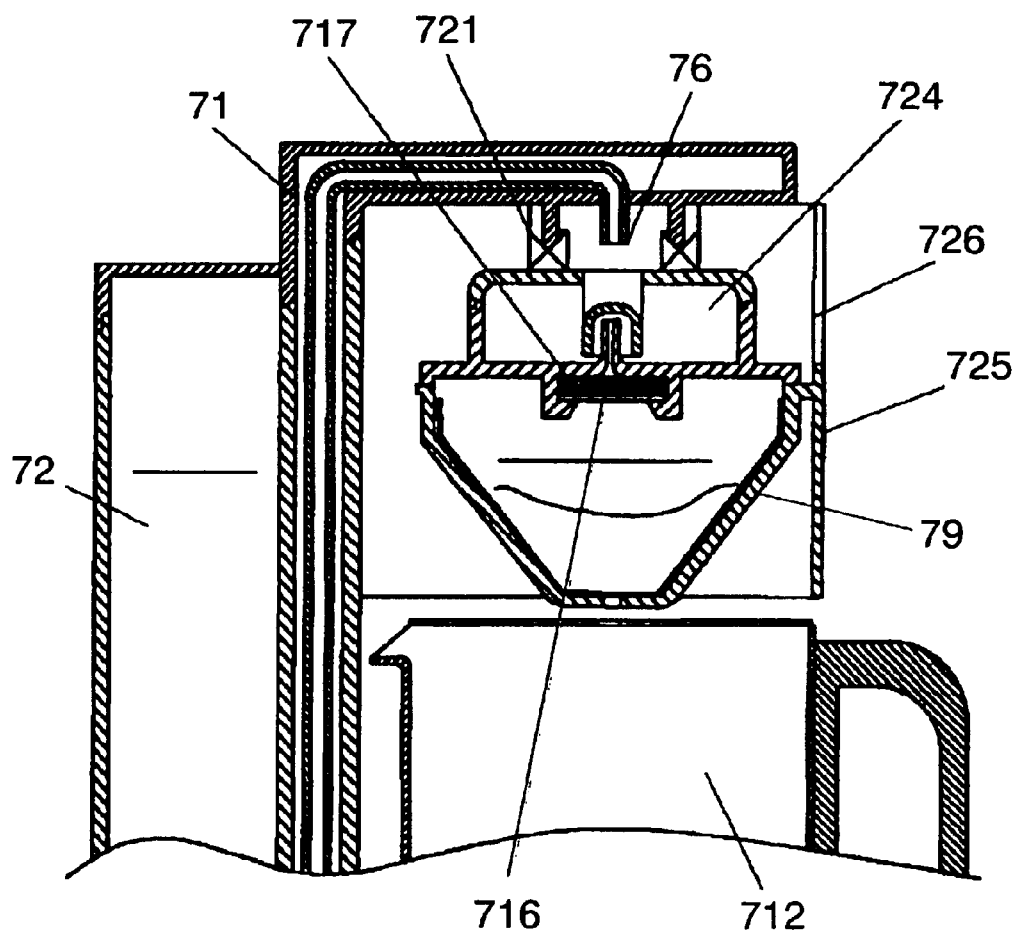
FIG. 14 is a sectional view of an essential part of a coffee maker in accordance with a seventh exemplary embodiment.

FIG. 14 is a sectional view of an essential part of a coffee maker in accordance with the seventh exemplary embodiment. The seventh embodiment differs from the embodiments previously discussed in the following points.

In this seventh embodiment, hot-water tank 724 is disposed on coffee-extracting room 79. Extracting room 79 is movable horizontally, as if a swing basket were, with respect to main body 71 of the coffee maker. Above tank 724, hot-water outlet 76 is situated. Elastic sealing section 721 is provided to main body 71 of the coffee maker, and sealing section 721 surrounds hot-water outlet 76. Sealing section 721 is situated such that sealing section 721 is brought into contact with an upper face of tank 724. A basic structure of tank 724 is similar to that of hot-water tank 38 described in the second embodiment. Outer fence 725 covers an outside of extracting room 79 and moves horizontally together with extracting room 79. Monitoring section 726, taking the form of a window or a transparent part, is provided to a part of outer fence 725. A user can monitor a status of tank 724 in progress or at completion of coffee extraction. If hot-water tank 724 is made of transparent material, a user can monitor a status inside thereof.

As described in the previous embodiments, according to the coffee maker of the present invention, while hot water is supplied intermittently to extract tasty coffee solution of good body, maintenance of the hot-water tank after the extraction can be done with ease. For instance, drops of water attached to an inner wall of the hot-water tank can be wiped away, and scales attached to the tank can be washed away with ease.

What is claimed is:

1. A coffee maker comprising:
   (a) a coffee extracting room; and
   (b) a hot water tank, disposed between said coffee extracting room and a hot-water outlet which supplies hot water to said extracting room, said hot water tank including a water purifying agent and a siphon mechanism,
   wherein the hot water is purified and supplied from said hot water tank to said coffee extracting room via the siphon mechanism.

2. The coffee maker of claim 1, wherein a water purifying room which contains the water purifying agent is disposed in said hot water tank.

3. The coffee maker of claim 2, wherein granular activated charcoal is used as the water purifying agent, and an opening provided on a side-wall of the water purifying room is small enough for the granular activated charcoal not to pass through.

4. The coffee maker of claim 2, wherein an opening provided to the water purifying room faces the siphon mechanism.

5. The coffee maker of claim 1, wherein the siphon mechanism includes a pipe for supplying purified water to said coffee extracting room and a cap spaced from the pipe at a predetermined distance, the cap covering the pipe.

6. The coffee maker of claim 5, wherein one of the pipe and the cap is unitarily formed with a water purifying room which contains the water purifying agent.

7. The coffee maker of claim 2, wherein the water purifying room is situated lower than a cap bottom covering a top of a pipe which activates a siphon phenomenon.

8. The coffee maker of claim 1, wherein said hot water tank includes:
   (a) a recess utilizing a lid of said coffee extracting room as a bottom plate through which a plurality of holes are punched;
   (b) a partitioning board, for partitioning the recess, having a bottom and a pipe; and
   (c) a cap for covering the pipe with a predetermined space.

9. The coffee maker of claim 8, wherein the partitioning board is pinched by a member forming the cap and the lid of said coffee extracting room.

10. A coffee maker comprising:
   (a) a water tank;
   (b) a heater for heating water supplied from said water tank and producing hot water;
   (c) a hot water tank, for storing the hot water supplied from said heater via a supplying path, including a siphon mechanism; and
   (d) a coffee extracting room to which the hot water is supplied via the siphon mechanism, said coffee extracting room being separated and detachable from the supplying path.

11. The coffee maker of claim 10, wherein said hot water tank is unitarily formed with a lid of said coffee extracting room.

12. The coffee maker of claim 10, wherein said hot water tank is detachable from the lid of said coffee extracting room.

13. The coffee maker of claim 10 further comprising a sprinkler for spraying the hot water in said coffee extracting room, wherein the sprinkler is unitarily formed with a water purifier.

14. The coffee maker of claim 10, wherein a draining hole is prepared at a bottom of said hot water tank.

15. The coffee maker of claim 10, wherein a sealing section is disposed between said hot water tank and the supplying path.

16. The coffee maker of claim 10, wherein said hot water tank is movable together with said coffee extracting room.

17. The coffee maker of claim 16, wherein a monitoring section is prepared on an outer fence of said coffee extracting room.

18. A coffee maker comprising:
   (a) a water tank;
   (b) a heater for heating water supplied from said water tank and producing hot water;
   (c) a coffee extracting room,
   (d) a hot-water supplying path extending from said heater to a hot-water outlet which supplies the hot water to said coffee extracting room;
   (e) a water purifier; and
   (f) a hot water tank including a siphon mechanism,
      wherein said water purifier and said hot water tank are placed between the outlet and said coffee extracting room, so that the hot water is purified and supplied from said hot water tank to said coffee extracting room via the siphon mechanism.

19. The coffee maker of claim 18, wherein said water purifier is linked to one of said hot water tank and a lower part of the hot water outlet.

20. The coffee maker of claim 18, wherein said hot water tank is separated and detachable from said hot-water supplying path.

* * * * *